United States Patent [19]

Okumura et al.

[11] Patent Number: 4,763,776
[45] Date of Patent: Aug. 16, 1988

[54] METHOD AND APPARATUS FOR TRANSPORTING AN ARTICLE

[75] Inventors: Ichiro Okumura; Kazuhiro Izukawa; Takuo Okuno, all of Yokohama; Takayuki Tsukimoto, Fujisawa, all of Japan

[73] Assignee: Canon Kabushiki Kaisha, Tokyo, Japan

[21] Appl. No.: 941,532

[22] Filed: Dec. 10, 1986

Related U.S. Application Data

[63] Continuation of Ser. No. 764,987, Aug. 12, 1985, abandoned.

[30] Foreign Application Priority Data

Aug. 24, 1984 [JP] Japan ................................ 59-175105

[51] Int. Cl.⁴ .............................................. B65G 35/00
[52] U.S. Cl. .................................... 198/630; 198/771; 198/790; 74/155
[58] Field of Search ............... 198/630, 752, 771, 790; 74/155

[56] References Cited

U.S. PATENT DOCUMENTS

| 2,960,314 | 11/1960 | Bodine | 74/155 |
|---|---|---|---|
| 3,295,667 | 1/1967 | Kittle | 198/771 |
| 3,416,632 | 12/1968 | Bodine | 181/5 |
| 3,536,001 | 10/1970 | Bodine | 100/41 |
| 3,613,869 | 10/1971 | Schuricht | 198/771 |
| 3,841,461 | 10/1974 | Henderson et al. | 198/630 |
| 3,980,172 | 9/1976 | DeGood | 198/790 |
| 4,562,374 | 12/1985 | Sashida | 310/328 |

FOREIGN PATENT DOCUMENTS

| 1044478 | 11/1958 | Fed. Rep. of Germany . | |
|---|---|---|---|
| 2516165 | 10/1976 | Fed. Rep. of Germany | 198/630 |
| 2712764 | 10/1977 | Fed. Rep. of Germany | 198/771 |
| 58-148682 | 9/1983 | Japan | 198/630 |
| 758631 | 10/1956 | United Kingdom | 74/155 |
| 589171 | 1/1978 | U.S.S.R. | 198/630 |
| 715400 | 2/1980 | U.S.S.R. | 198/630 |

OTHER PUBLICATIONS

Translation of Official Actions of German Patent Office, dated Jun. 11, 1986, and Jun. 29, 1987.

Primary Examiner—Joseph E. Valenza
Attorney, Agent, or Firm—Fitzpatrick, Cella, Harper & Scinto

[57] ABSTRACT

Apparatus for transporting articles, the articles being positioned on bar-like members which in turn are caused to bend periodically in a wave pattern. The periodic bending is controlled to produce a driving force on the articles in a predetermined direction.

10 Claims, 5 Drawing Sheets

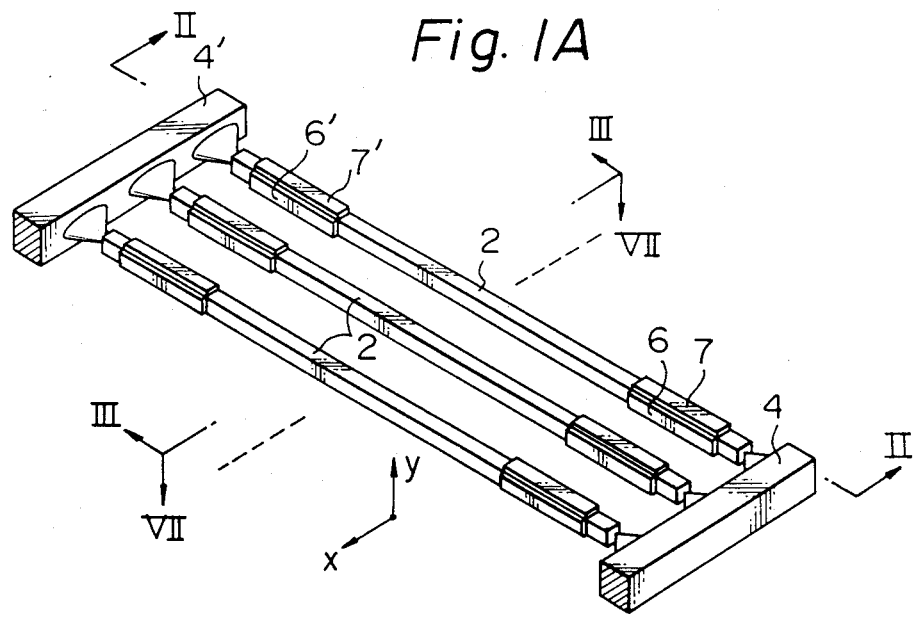
Fig. IA
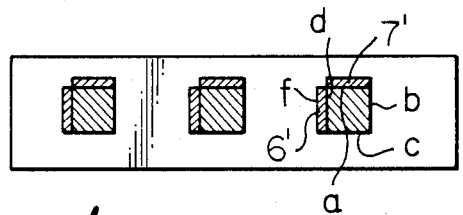
Fig. IB
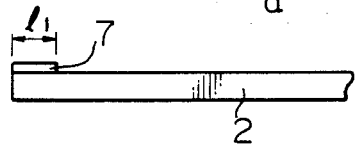
Fig. IC
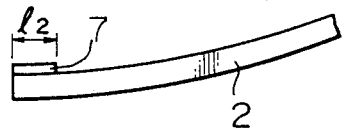
Fig. ID
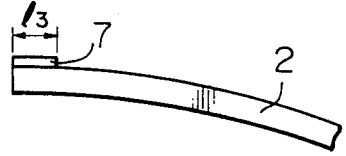
Fig. IE

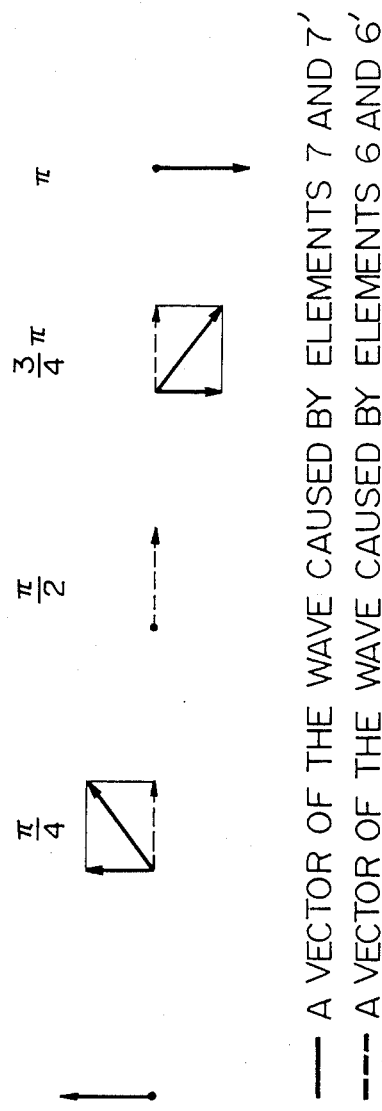

METHOD AND APPARATUS FOR TRANSPORTING AN ARTICLE

This application is a continuation of application Ser. No. 764,987 filed Aug. 12, 1985, now abandoned.

BACKGROUND OF THE INVENTION

1. Field of the Invention

The present invention relates to method and apparatus for transporting an article, ad more particularly to method and article for transporting an article by utilizing periodic deformation of a plurality of bar-like members.

2. Description of the Prior Art

In prior art article transport apparatus, a motor or a linear motor which utilizes an electromagnetic force has been widely used as a drive source for transport. However, since such an actuator is constructed by cores, copper windings and permanent magnets, the number of components is large and they impose a heavy weight. Accordingly, it is difficult to attain a compact and light transport apparatus.

On the other hand, a motor or linear motor in which a travelling vibration wave comprising a lateral wave and a longitudinal wave is generated on a surface of an elastic member by an ultrasonic wave resonator and the vibration wave is converted to rotational or unilateral motion has been proposed (Japanese Patent Application Laid open No. 148682/1983). However, since such an actuator uses a travelling vibration wave, it is necessary to continuously circulate the vibration wave and it is essential to provide an area in which the vibration wave circulates. As a result, when the transparent apparatus is constructed by using such a motor, it is difficult to attain a transport apparatus which is sufficiently small and light to meet these requirements.

SUMMARY OF THE INVENTION

It is an object of the present invention to provide a novel transport method and a transport apparatus therefor which is simple in construction and light and compact.

It is another object of the present invention to provide a method for transporting an article contacted by bar-like members in a predetermined direction, comprising steps of:

arranging a plurality of bar-like members at locations along the predetermined direction;

periodically bending the bar-like members in at least two directional normal to a longitudinal direction of the bar-like members to deform the bar-like members in a wave shape and periodically moving the wave-shape deformation of the bar-like members; and bending the bar-like members such that their wave shape deformation takes place in the same direction.

It is another object of the present invention to provide a transport apparatus comprising:

a plurality of bar-like members; and vibration elements mounted on the bar-like members.

The vibration elements are arranged for periodically bending send bar-like members in at least two directions normal to a longitudinal direction of the bar-like members.

Also the bar-like members are arranged at locations along a direction of transfer.

BRIEF DESCRIPTION OF THE DRAWINGS

FIG. 1A is a partial perspective view of a transport apparatus of the present invention, FIG. 1B is a sectional view, taken along a line III—III of FIG. 1A, of the transport apparatus of FIG. 1A, FIGS. 1C–1E illustrate a principle of creation of bend in bar-like members of the present invention, FIG. 10 illustrates a principle of creation of rotating vibration according to the present invention.

DETAILED DESCRIPTION OF THE PREFERRED EMBODIMENTS

Figure 2:
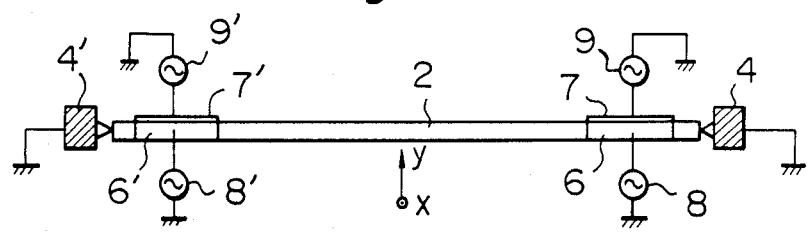
FIG. 2 is a sectional view taken along a line II—II of FIG. 1A, FIGS. 3 and 5 are graphs of applied voltages to electrostrictive elements on the bar-like members of the transport apparatus of FIG. 1A, FIGS. 4A, 4B and 6 show vibration of the bar-like members.

FIG. 1A shows a partial perspective view of a transport apparatus of the present invention, FIG. 1B is a sectional view taken along a line III—III of FIG. 1A, and FIG. 2 is a sectional view taken along a line II—II of FIG. 1A. In the present embodiment, a plurality of bar-like members 2 are arranged in parallel. Each of the bar-like members 2 has a square cross-section which is normal to a longitudinal direction and is made of a material of uniform elastic modulus. Thus, the bar-like members 2 each has bending elasticity. The bar-like members 2 are each supported by support members 4 and 4' at opposite ends thereof such that two opposing sides a and c of four sides a, b, c and d of each bar-like member 2 are parallel to a horizontal direction and other two sides b and d are normal to the horizontal direction. Electrostrictive elements 6, 7 and 6', 7' are bonded to the top side a and one side c or d of each bar-like member 2 near the opposite ends thereof. The electrostrictive elements may be PZT piezoelectric ceramics and are fixed to the bar-like members 2 such that they strain in the longitudinal direction of the bar-like members 2 when voltages are applied thereto. A pair of electrodes are arranged on both sides (a joint surface d to the bar-like member 2 and the opposite surface f to the joint surface) of the electrostrictive element 6. As shown in FIG. 2, one end of an A.C. voltage application means 8 is connected to one of the electrodes while the other electrode is grounded through the bar-like member 2 and a conductor which extends through the support member 4 or 4'. The other end of the voltage application means 8 is also grounded so that an A.C. voltage application circuit to the electrostrictive element 6 is constructed. Similarly, a second A.C. voltage application means 9 is connected to the electrostrictive element 7, and further A.C. voltage application means 8' and 9' are connected to the electrostrictive elements 6' and 7', respectively.

A principle of operation of the present embodiment is now explained.

Assuming that the electrostrictive element 7 is fixed at one end of the bar-like member 2 as shown in FIG.

Figure 4A:
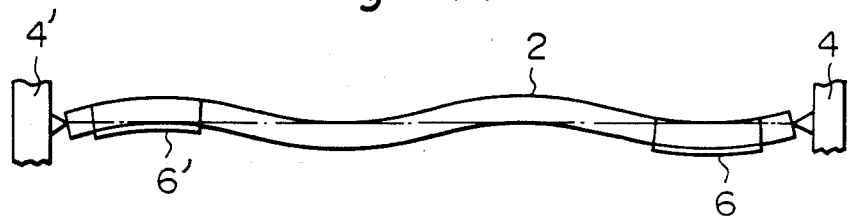
Figure 4B:

1C, if a positive voltage is applied to the electrostrictive element 7, the electrostrictive element 7 shrinks from $l_1$ and $l_2$ ($l_1 > l_2$) in the longitudinal direction of the bar-like member 2 and the bar-like member 2 is bent upward as shown in FIG. 1D. If a negative voltage is applied to the electrostrictive element 7, the electrostrictive element 7 expands from $l_1$ to $l_3$ ($l_1 < l_3$) in the longitudinal direction of the bar-like member 2 and the bar-like member 2 is bent downward. If an A.C. voltage having a frequency fx corresponding to a specific vibration of a bending vibration to a direction x in the bar-like member 2 is applied to the electrostrictive element 6 attached to the side d of the bar-like member 2 by the voltage application means 8, a bending oscillation in the direction x is created in the bar-like member 2. An A.C. voltage having the frequency fx is also applied to the electro-strictive element 6' by the voltage application means 8'. The voltage Vx applied to the electrostrictive element 6 and the voltage V'x applied to the electrostrictive element 6' have a phase difference of 180 degrees therebetween. As a result, a large standing wave vibration having nodes at the opposite ends is generated in the bar-like member 2. This is shown in FIG. 4A and the vibration is shown in FIG. 4B. In the present example, the vibration is of fourth order vibration mode.

A condition under which the standing wave oscillation takes place is as follows.

An A.C. voltage having a frequency corresponding to a specific vibration frequency f of the bar-like member ($v = \lambda f$, $l = (n/2) \lambda$ where $v$ is a propagation speed, $\lambda$ is a wavelength and l is a length of the bar-like member) is applied to the electrostrictive elements.

While the electrostrictive elements 6 and 6' are arranged at the opposite ends of the bar-like member in the present embodiment, the number of electrostrictive elements is not limited to two but one such element may be used to generate the standing wave vibration. The phase difference between the A.C. voltages applied to the elements 6 and 6' is 180 degrees because the elements 6 and 6' are located at loops of the vibration and a distance between the elements 6 and 6' is an odd multiple of one-half wavelength, although this is not restrictive. The standing wave vibration is generated by superposition of travelling waves generated by the electrostrictive elements (or a wave generated by one electrostrictive element) and the waves reflected by the fixed end of the bar-shaped member.

Figure 5:
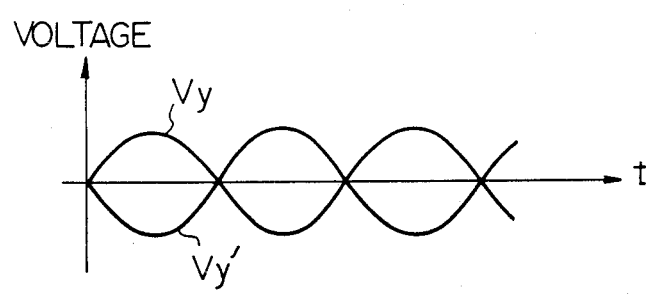

In a similar manner, an A.C. voltage Vy having a frequency fy corresponding to a specific frequency of a bending vibration in the direction y of the bar-like member 2 is applied to the electrostrictive element 7 arranged on the top surface a of the bar-like member 2 by the voltage application means 9, and an A.C. voltage V'Y having the frequency fy and a phase difference of 180 degrees as shown in FIG. 5 is applied to the electrosttictive element 7' by the voltage application means 9' so that a standing wave vibration similar to that in the direction x is generated in the direction y in the bar-like member 2.

In the present embodiment, assuming that the bar-like member 2 is symmetrical in shape in the directions x and y and is made of a material of uniform elastic modulus, the frequencies fx and fy are equal.

Figure 3:
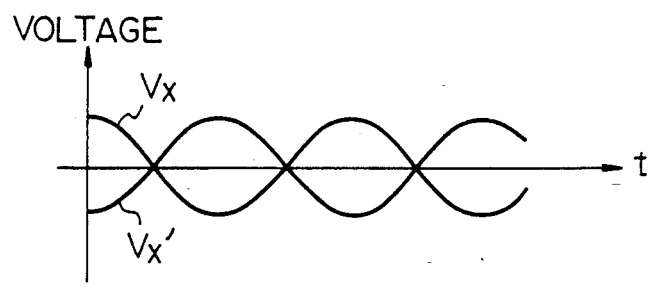
Figure 6:
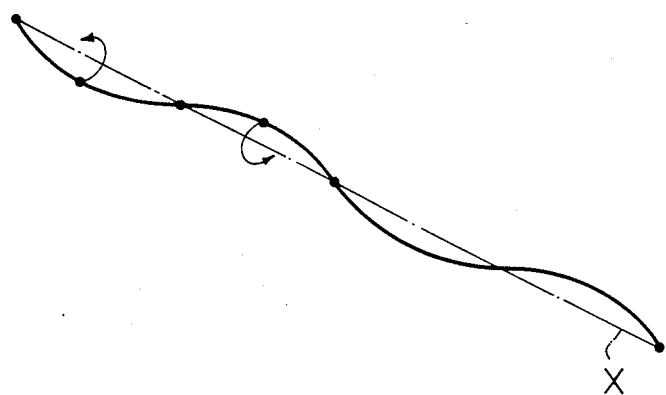

If the A.C. voltages Vx and V'x applied to the electrostrictive elements 6 and 6' and the A.C. voltages Vy and V'y applied to the electrostrictive elements 7 and 7' have a phase difference of 90 degrees as shown in FIGS. 3 and 5 and those voltages are simultaneously applied to the electrostrictive elements 6, 6', 7 and 7', a rotating vibration is generated in the bar-like member 2. Namely, by superimposing the bending vibration in the direction x and the bending vibration in the direction y as shown in FIG. 4, the bar-like member 2 is rotated around the x axis at a constant angular velocity as shown by an arrow in FIG. 6 while the bar-like member 2 holds a wave shape.

Figure 9A:
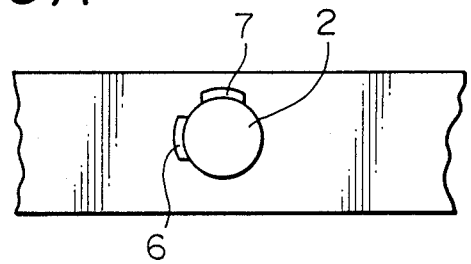
Figure 9B:
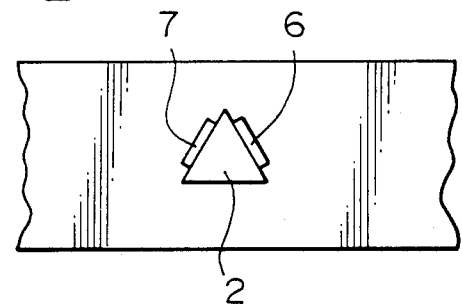

The principle of generation of the rotating vibration will now be explained. The vibration at a point of the bar-like member 2 in time is shown in FIG. 10. By the superposition of the waves generated in the elements 7 and 7' and the waves generated in the elements 6 and 6', the bar-like member is rotated around the x axis while it holds the wave shape. Accordingly, if the directions of vibration of the electrostrictive element are normal to each other, the phase difference must be 90 degrees in order to attain the vibration with the constant amplitude, but it is not limited to 90 degrees if the constant amplitude is not considered. The above explanation can not be applied if the directions of vibration are not normal to each other as shown in FIG. 9B.

Figure 7:
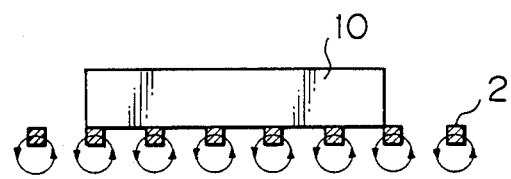
FIG. 7 is a sectional view showing an operation state of the apparatus of FIG. 1A.

FIG. 7 is a sectional view taken along a line VII—VII of FIG. 1 in the operation condition of the present embodiment. When the bar-like member 2 make the rotating vibration as described above, the bar-like members 2 rotate in the same direction, an article 10 mounted on the bar-like members 2 is transported in the direction of arrangement of the bar-like members 2, that is, in the direction x by a frictional force at contact areas (loops of the vibration) to the bar-like members 2. A radius of the rotating vibration of the bar-like member 2 can be controlled by the amplitude of the voltages applied to the electrostrictive elements so that the transport velocity of the article 10 can be controlled.

In the present embodiment, the bar-like members each has a square section. As shown in FIGS. 9A and 9B, the bar-like members each may have a circular section or other shape, although it is preferable that it is of 90-degrees rotation symmetric shape when the material of uniform elastic modulus is used. While the phase differences of the applied voltages are 90 degrees and 180 degrees in the present embodiment, other phase differences may be used to attain similar result.

Figure 8:
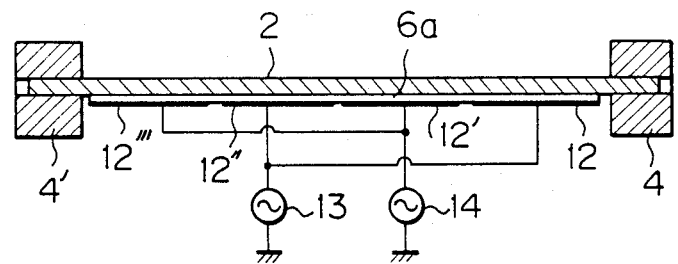
FIG. 8 is a sectional view of the present apparatus of FIG. 1A, FIGS. 9A and 9B show modifications of the bar-like members of the apparatus of the present invention.

In the present embodiment, the electrostrictive elements are attached to the opposite ends of the bar-like elements 2. Alternatively, they may be attached to only one end of the element. As shown in FIG. 8, an electrostrictive element 6a may be attached over the entire length of the bar-like member 2 and electrodes 12, 12', 12'' and 12''' divided in accordance with a vibration mode of the bar-like element 2 may be arranged along the elctrostrictive element 6a and A.C. voltages having a phase difference of 180 degrees may be applied to alternate electrodes by voltage application means 13 and 14. In this manner, a large radius of rotating vibration is attained with relatively small applied voltages and the transport velocity can be increased.

In the present embodiment, the bar-like members 2 are supported by the support members 4 and 4' such that the bending moments at the opposite ends of the bar-like mmebers 2 are zero. Alternatively, they may be fixed by the support members 4 and 4' as shown in FIG. 8. In this case, the structure of the support members may be relatively simple.

The bar-like members meet the following relationship. If only transport is required, they need only to have equal rotation direction, and no other condition need be met. In order to transport the article stably at a constant velocity, the bar-like members are required to make the rotating vibrations at the same velocity. A simplest way to attain this is to arrange the bar-like members of the same shape and structure in parallel and drive them by the same signal.

In the present embodiment, the bar-like members need not be arranged completely in parallel. When it is desired to transport the article along a curved path, the bar-like members are arranged at an angle in accordance with the curved path.

In the present invention, it is not necessary that the frequencies of the bending vibration in the two different directions in the bar-like member 2 are same but they may be different. In this case, however, a portion of the vibration energy which is utilized for the transport is lowered and the transport efficiency is lowered.

What is claimed is:

1. A method for transporting an article contacted by bar-like members in a predetermined direction, comprising steps of:
    arranging a plurality of bar-like members at locations along said predetermined direction;
    supporting said bar-like members near their ends;
    periodically bending said bar-like members in at least two directions normal to a longitudinal direction of the bar-like members at locations between their supports to deform the bar-like members in a wave shape and periodically moving the wave-shape deformation of the bar-like members; and
    bending the bar-like members such that their wave shape deformations take place in the same direction.

2. A method for transporting an article according to claim 1, wherein said plurality of bar-like members are arranged essentially parallel to each other.

3. A transport apparatus comprising:
    a plurality of bar-like members;
    support means for supporting said bar-like members near their ends; and
    vibration elements mounted on said bar-like members between said support means in at least two directions normal to a longitudinal direction of the bar-like members for periodically bending said bar-like members in at least two directions normal to a longitudinal direction of the bar-like members in wave shape and periodically moving the wave-shape deformation of the bar-like members;
    said bar-like members being arranged at locations along a direction of transport.

4. A transport apparatus according to claim 3, wherein said bar-like members are arranged in essentially parallel relationship with each other.

5. A transport apparatus according to claim 3, wherein said bar-like members are arranged to be periodically bent in the same direction.

6. A transport apparatus according to claim 3, wherein said bar-like members have square cross sections normal to the longitudinal direction thereof.

7. A transport apparatus comprising:
    a bar-like member;
    means pivotally supporting said bar-like member near its ends; and
    vibration elements mounted on said bar-like member in at least two directions normal to a longitudinal direction of the bar-like member between said supporting means for periodically bending said bar-like member in at least two directions normal to a longitudinal direction of the bar-like member in wave shape and periodically moving the wave-shape deformation of the bar-like member;
    said bar-like member being arranged at a location along a direction of transport.

8. A transport apparatus according to claim 7, wherein said bar-like member is arranged in essentially parallel relationship with at least one other bar-like member.

9. A transport apparatus according to claim 8, wherein said bar-like members are arranged to be periodically bent in the same direction.

10. A transport apparatus according to claim 7, wherein said bar-like member has a square cross section normal to the longitudinal direction thereof.

* * * * *

UNITED STATES PATENT AND TRADEMARK OFFICE
CERTIFICATE OF CORRECTION

PATENT NO. : 4,763,776

DATED : August 16, 1988

INVENTOR(S) : ICHIRO OKUMURA, KAZUHIRO IZUKAWA and TAKAYUKI TSUKIMOTO

It is certified that error appears in the above-identified patent and that said Letters Patent is hereby corrected as shown below:

Column 1, line 11, "ad" should read -- and --;
        line 12, "article" (first occurrence) should read -- apparatus --;
        line 35, "transparent" should read -- transport --;
        line 52, "directional" should read -- directions --.

Column 3, line 54, "V'Y " should read -- V'y --;
        line 56, "trosttictive" should read -- trostrictive --.

Column 4, line 16, "element" should read -- elements --;
        line 25, "member" should read -- members --;
        line 53, "elctrostrictive" should read -- electrostrictive --;
        line 62, "mmebers 2" should read -- members 2 --.

Signed and Sealed this

Seventh Day of March, 1989

Attest:

DONALD J. QUIGG

Attesting Officer      Commissioner of Patents and Trademarks